United States Patent Office 3,004,110
Patented Oct. 10, 1961

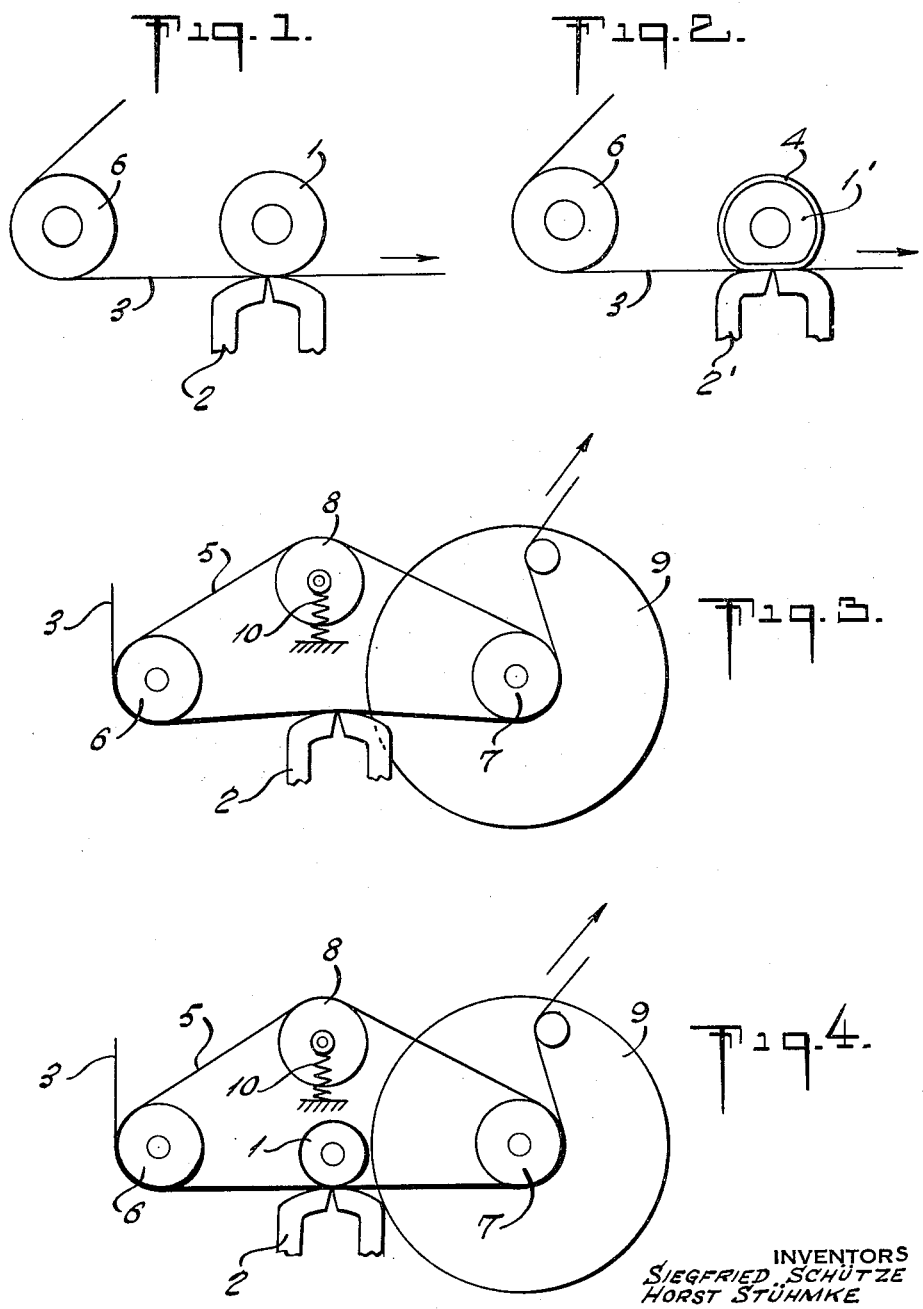

3,004,110
SOUND SCANNING DEVICE FOR PERFORATED SOUND CARRIERS HAVING MAGNETIC SOUND TRACKS
Siegfried Schütze and Horst Stühmke, Dresden, Germany, assignors to VEB Kamera- und Kinowerke Dresden
Filed Jan. 30, 1957, Ser. No. 637,192
3 Claims. (Cl. 179—100.2)

This invention relates to a magnetic scanning or playback device, and more particularly to a device for scanning or picking-up perforated magnetic sound tapes or motion picture films of small width, provided with magnetic sound tracks.

In the production of narrow sound motion picture films which are provided with magnetic sound tracks, it is customary to arrange the magnetic sound track between the sprocket perforations and the adjacent edge of the film in such a manner that the sound track extends proximate to said perforations. As a result, during the manufacture of such perforations in such film, a deformation of the marginal film parts adjoining the perforations, including those parts carrying the sound track, invariably results. In the playing back or scanning of such recordings, modulation distortion occurs, which is generally known as "flutter." Such deformations may also be caused by a frequent playing of the tape or film, resulting in the formation of burr or bulging at the perforations.

An object of the invention is to provide a scanning device for the scanning of perforated magnetic sound track carriers, particularly narrow motion picture films, by means of which the occurrence of modulation distortion caused by deformations is avoided.

According to the invention, this is acomplished by providing means for feeding the film or tape in a substantially straight line past the sound head of the playback apparatus, and resilient means to press the film or tape against the sound head at the scanning point, in such a manner that existing deformations are flattened out. This resilient means may be in the nature of a roller, endless band, or the like.

Another object of the invention is the provision of a scanning device of the character described which avoids undesired wear and tear of the magnetic sound carrier.

A further object of the invention is the provision of a scanning device of the character described which avoids the undesired creation of longitudinal oscillation of the magnetic sound carrier passing the scanning head.

Other objects and structural details of the invention will be apparent from the following description when read in conjunction with the acompanying drawings forming part of this specification, and wherein:

FIG. 1 is a plan view of a scanning device according to the invention with portions thereof shown diagrammatically and broken away for convenience of illustration;

FIG. 2 is a similar plan view of another scanning device made in accordance with the invention;

FIG. 3 is a similar plan view of a further embodiment of a scanning device made in accordance with the invention; and FIG. 4 is a similar plan view of still another embodiment of the scanning device of the invention.

Referring to FIG. 1, there is shown a rotatable idler roller 1 which is made of soft elastic material, and is arranged to press a perforated magnetic sound carrier, such as a perforated film 3 having a magnetic sound track, against a magnetic play-back or scanning head 2. The perforated film 3 is guided in a straight line path in the direction of the arrow in FIG. 1 before and after its contact with the scanning head 2. For this purpose a guide roller 6, and a second guide roller 7 (FIG. 3) are rotatably mounted on either side of the roller 1 in alignment therewith. The pressure roller 1 may be swingably or resiliently mounted and may be biased in the direction of scanning head 2. The surface of the scanning head 2 facing the perforated film or tape 3 may be slightly curved, as shown in FIG. 1, or may be straight (as shown in FIG. 2).

Since the film or tape 3 is held taut between the guide rollers 6 and 7 and is extended in a straight line on either side of the scanning head 2, deformation such as bulging, is avoided in the film 3. In addition, the soft resilient pressure roller 1 presses the film or tape, in the region of the perforations and sound track, against the scanning head 2, thereby flattening out any existing deformations. The soft roller 1 is particularly effective in flattening out or pressing out deformations or bulges in the tape or film, since it engages the tape along a surface area rather than at a point.

According to the embodiment shown in FIG. 2, the pressure roller 1' is provided with a cover 4 of bendable or deformable material which is non-stretchable or only slightly stretchable. For example, the cover 4 may be made of spring bronze, or of a synthetic material such as polyvinyl chloride. The film 3 carrying the magnetic sound track is again guided in a straight line past the scanning head 2' by guide rollers 6 and 7 (only 6 being shown). The scanning head 2' in this instance is provided with a flat surface facing the film 3, although it may, if desired, be provided with the slightly curved surface of the head 2 in FIG. 1.

Since the circumferential surface of roller 1', as provided by the cover 4, is bendable but not stretchable, the deformation of the sound carrier in the vicinity of the sprocket perforations is further reduced. The circumferential roller surface pressing the sound carrier against the scanning head 2' maintains a uniform pressure upon the film or tape sound carrier, and the pressing-on surface cannot deviate, as may result in the use of a stretchable and resilient material. This is particularly effective when a scanning head with a flat operating surface, such as the head 2', is used, the bendable outer cover 4 of roller 1' presenting a substantially flat surface against the sound carrier and scanning head, as shown in FIG. 2.

In the embodiment shown in FIG. 3, an endless band 5 is used to press the film or tape 3 against the scanning head 2. The endless band 5 is made of a flexible, preferably non-stretchable material, such as a non-magnetic resilient metal, or a woven synthetic plastic material such as nylon or other fiber-forming synthetic material. The band 5 is trained around the guide rollers 6 and 7 and also around an idler tension roller 8. A compression spring 10 may be employed to bias the tension roller 8 toward the portion of band 5 in contact therewith, and thus to tension the band around the rollers 6, 7 and 8. The band 5 is thus tensioned between rollers 6 and 7 so that it carries the film or tape 3 past the scanning head 2 as indicated by the arrow in FIG. 3. The endless band 5 is driven by the perforated film or tape 3 which engages it, and in turn the band 5 presses the film or tape 3 against the scanning head 2. A flywheel 9 may be rigidly connected with the roller 7 to insure that the endless band travels at a uniform speed.

In this instance, it will be noted in FIG. 3 that the guide rollers 6 and 7 are located slightly forwardly of the engaging surface of the scanning head 2, so that the band 5 makes a slight angle in passing the head 2. This insures an area of contact with the scanning head rather than a line contact. The angle formed by the band 5 is, however, such a slight one that it may be said that the film or tape is guided in substantially a straight line past the head.

If the endless band 5 is made of a material having a high friction coefficient, or if the band 5 is roughened in a suitable manner, the adherence of the film 3 to the endless band 5, and the adherence of the latter to the idling roller 7, connected to flywheel 9, is increased.

The sound carrier 3 and the endless band 5 are thus in firm contact before, at, and after the sound head 2, so that the band 5 holds the film or tape 3 on a straight line along substantially all of this area of contact, and is effective in preventing deformation of the sound carrier in the vicinity of its perforations and sound track, thus avoiding interference modulation or "flutter."

The tension on roller 8 provided by spring 10 should be strong enough to make the endless band 5 sufficiently taut to press the sound carrier 3 firmly against the sound head 2, particularly in the area of its perforations and sound track.

The embodiment shown in FIG. 4 is a combination of the embodiments shown in FIGS. 1 and 3. The pressure roller 1 is used herein in conjunction with the endless band 5 to increase the pressure on the film or tape 3 against the scanning head 2.

While preferred embodiments of the invention have been illustrated and described herein, it is obvious that numerous additions, omissions and changes may be made in such embodiments without departing from the spirit and scope of the invention. For example, the embodiments of FIGS. 2 and 3 could be combined by utilizing the lined roller 1' of FIG. 2 with the endless belt arrangement of FIG. 3, in the manner suggested in FIG. 4.

What is claimed is:

1. A sound transducer arrangement for film having a sound carrier adjacent a longitudinal row of perforations which cause deformations across the plane of said film, comprising a smooth-faced scanning head, means for guiding said sound carrier in a linear path past said scanning head, and a rotatable idler roller mounted adjacent said scanning head and positioned to press said sound carrier against said scanning head, said idler roller including a body of soft resilient material and a circumferential cover of flexible substantially non-stretchable material, said body forcing said sound carrier and said cover to assume the shape of said scanning head, whereby said deformations are flattened during sound scanning by the pressure of said idler roller against said film.

2. A scanning arrangement for a sound carrier having deformations across its plane, comprising a substantially rigid scanning head, means for longitudinally moving said sound carrier in a path past said scanning head, and a rotatable idler roller of soft resilient material, having a circumferential cover of flexible and substantially non-stretchable material, mounted adjacent said scanning head and positioned on the side of said sound carrier opposite and close enough to said scanning head to deform the shape of said roller and press said sound carrier against said scanning head with sufficient force to reform said deformations.

3. A scanning arrangement for sound reproduction of a deformed sound carrier comprising a scanning head, means for guiding said carrier past said scanning head, idling means engaging said carrier for movement thereby and positioned to press said carrier against said scanning head, said idling means including a flexible portion in engagement with said carrier and a resilient portion forcing said carrier and said flexible portion to assume the shape of the surface of said scanning head.

References Cited in the file of this patent

UNITED STATES PATENTS

| | | |
|---|---|---|
| 2,453,031 | Olds | Nov. 2, 1948 |
| 2,490,771 | Begun | Dec. 13, 1949 |
| 2,542,590 | Stone | Feb. 20, 1951 |
| 2,603,721 | Camras | July 15, 1952 |
| 2,658,427 | Ver Doot | Nov. 10, 1953 |
| 2,768,244 | Tiger | Oct. 23, 1956 |
| 2,793,253 | Howey | May 21, 1957 |
| 2,844,434 | Beard | July 22, 1958 |
| 2,918,537 | Camras | Dec. 22, 1959 |
| 2,927,972 | Del Valle | Mar. 8, 1960 |

FOREIGN PATENTS

| | | |
|---|---|---|
| 298,942 | Switzerland | May 31, 1954 |